United States Patent

Canziani et al.

[11] Patent Number: 5,803,230
[45] Date of Patent: Sep. 8, 1998

[54] DEVICE FOR MONITORING THE MOVEMENT OF THE LOADING/ UNLOADING BELT OF A TRANSPORTATION CARRIAGE, ESPECIALLY FOR SORTING APPARATUSES

[75] Inventors: Francesco Canziani, San Macario; Attilio Soldavini, Ferno, both of Italy

[73] Assignee: Sandvik AB, Sandviken, Sweden

[21] Appl. No.: 675,690

[22] Filed: Jul. 3, 1996

[30] Foreign Application Priority Data

Jul. 4, 1995 [IT] Italy ................................. MI95A1426

[51] Int. Cl.$^6$ ..................................................... B65G 47/46
[52] U.S. Cl. ........................................ 198/370.06; 198/358
[58] Field of Search ........................ 198/370.06, 358, 198/370.04

[56] References Cited

U.S. PATENT DOCUMENTS 4,815,582  3/1989  Canziani .
4,915,209  4/1990  Canziani .
4,938,335  7/1990  Canziani .
5,367,446  11/1994  Canziani .
5,588,520  12/1996  Affaticati et al. ................. 198/370.06

FOREIGN PATENT DOCUMENTS 0 343 612 B1  11/1989  European Pat. Off. .
0 343 613 B1  11/1989  European Pat. Off. .
0 481 341 B1  4/1992  European Pat. Off. .
2 111 933  7/1983  United Kingdom .

*Primary Examiner*—James R. Bidwell
*Attorney, Agent, or Firm*—Burns, Doane, Swecker & Mathis, L.L.P.

[57] ABSTRACT

A loading/unloading belt movement monitoring device includes magnets integral with the transportation carriage for providing a magnetic field which changes in time as a function of the speed of the loading/unloading belt and sensors on the machine frame for generating a signal indicative of the changing magnetic field, and used to monitor the movement of the loading/unloading belt.

8 Claims, 3 Drawing Sheets

DEVICE FOR MONITORING THE MOVEMENT OF THE LOADING/UNLOADING BELT OF A TRANSPORTATION CARRIAGE, ESPECIALLY FOR SORTING APPARATUSES

BACKGROUND OF THE INVENTION

1) Field of the Invention

The present invention is a device for monitoring the movement of the loading/unloading belt of a transportation carriage, the device being provided for monitoring the function of the individual carriages in sorting apparatuses. In particular, according to the invention, means are provided, integral with the carriage, that create a variable magnetic field as a function of the belt rotation speed, and means, located on the ground (e.g., on the frame of the sorting apparatus), that are capable of sensing and analyzing said signal in order to supply an information indicative of the rotation direction and the speed of the belt.

2) Discussion of Related Art

There are known sorting apparatuses comprising a plurality of transportation carriages onto which objects are loaded, the transportation carriages moving on a path along which a series of collection devices are arranged into which the objects are discharged. Transportation carriages with integral loading/unloading belts are used, for example, in sorting plants for mail, parcels and newspapers where a plurality of these carriages move continuously along a closed path, thereby transporting the objects to be sorted from an encoding and loading station to a plurality of destination points arranged along the path of the carriages.

When a carriage is in the proximity of the loading station where it is to be loaded with an object, the carriage's belt is rotated for a suitable time and at a suitable speed to ease the transfer of the object from the supplying device to the carriage. When the carriage is in the proximity of an unloading station where the transported object is to be discharged, the belt is driven with controlled acceleration and speed in order to assure that the load is discharged into a container at the unloading station designated by the load's encoding.

Sorting plants with carriages each having a loading/unloading belt are known for example from the following patents: EP 0,343,612, EP 0,343,613, EP 0,481,341, GB 2,111,933, U.S. Pat. No. 4,801,000, U.S. Pat. No. 4,815,582, U.S. Pat. No. 5,161,930 and U.S. Pat. No. 5,367,466.

In sorting plants adopting the above-mentioned carriages, a need is felt of checking for correctness the operation of the loading/unloading belt of each carriage. A consequence of an ill-working belt can be that the object is not properly sorted, or is discharged in the wrong collection station or between stations. In the light of the high performance of the presently known sorting plants, which typically sort several thousand objects per hour, it is clear that even a single ill-working belt can result in the inappropriate sorting of a remarkable number of pieces, unless it is immediately detected. For this reason, this type of carriage is often provided with electronic devices such as, for example, encoders that are suited to sense the rotation speed and direction of the belt and with means that are suited to transmit the information about the working conditions of the belt to a central computer, the central computer controlling the whole sorting operation of the plant.

These electronic devices for sensing the rotation speed and direction of the belt have a rather high production cost. Also, they must obviously be connected to a source of electric power, which makes it necessary to provide suitable devices, such as, for example, sliding electric contacts or the like. The electrical contact devices are expensive to install, subject to quick wear and cause frequent maintenance work to be done on the plants.

A need is therefore felt for another means that would allow the operation of the belt to be checked in order to have a confirmation that all the functions are regularly carried out. For economic reasons, it is important that the test can be carried out by devices that do not require electronic circuitry on board the carriage like in the known apparatuses, because such a solution would add heavily to the production costs. For instance, a sorting apparatus usually comprises several hundred carriages and would therefore require as many electronic devices.

The test moreover should possibly be carried out during the normal operation of the machine, which moves at a speed of higher than two meters per second, without the operation of the p ant to having to be interrupted. It would be preferable to carry out the test from a ground position, e.g., from a fixed position relative to (on) the frame of the sorting apparatus.

SUMMARY OF THE INVENTION

A main purpose of the present invention is to eliminate the above-mentioned draw-backs by creating a control device for the movement of the loading/unloading belt of a transportation carriage that would not require an electric supply on board the carriage.

To this purpose, the present invention provides for mounting onto each carriage devices that generate a magnetic field, the magnetic field changing with time as a function of the belt rotation speed, and devices located along the carriage path, these devices being capable of sensing the changing magnetic field in order to obtain a signal that is indicative of the operation of the belt.

The invention will preferably include a plurality of magnets fixed to the belt tensioning cylinder of the carriage, the rotation of which generates a variable magnetic field that is detected by aerials at ground.

The above object, as well as other objects that will become apparent from the following detailed description, are achieved by means of a movement monitoring device for the loading/unloading belt of a transportation carriage integrally provided with means that create a magnetic field, the magnetic field changing with time as a function of the speed of the belt, and means, integral with the machine frame, that sense and analyze a signal derived from the changing magnetic field.

BRIEF DESCRIPTION OF THE DRAWINGS

Further characteristics and advantages of the invention will become more apparent from the following description of preferred embodiments of the invention, the preferred embodiments being merely illustrative and non-limiting, as illustrated in the attached drawings in which.

DETAILED DESCRIPTION

Figure 1:
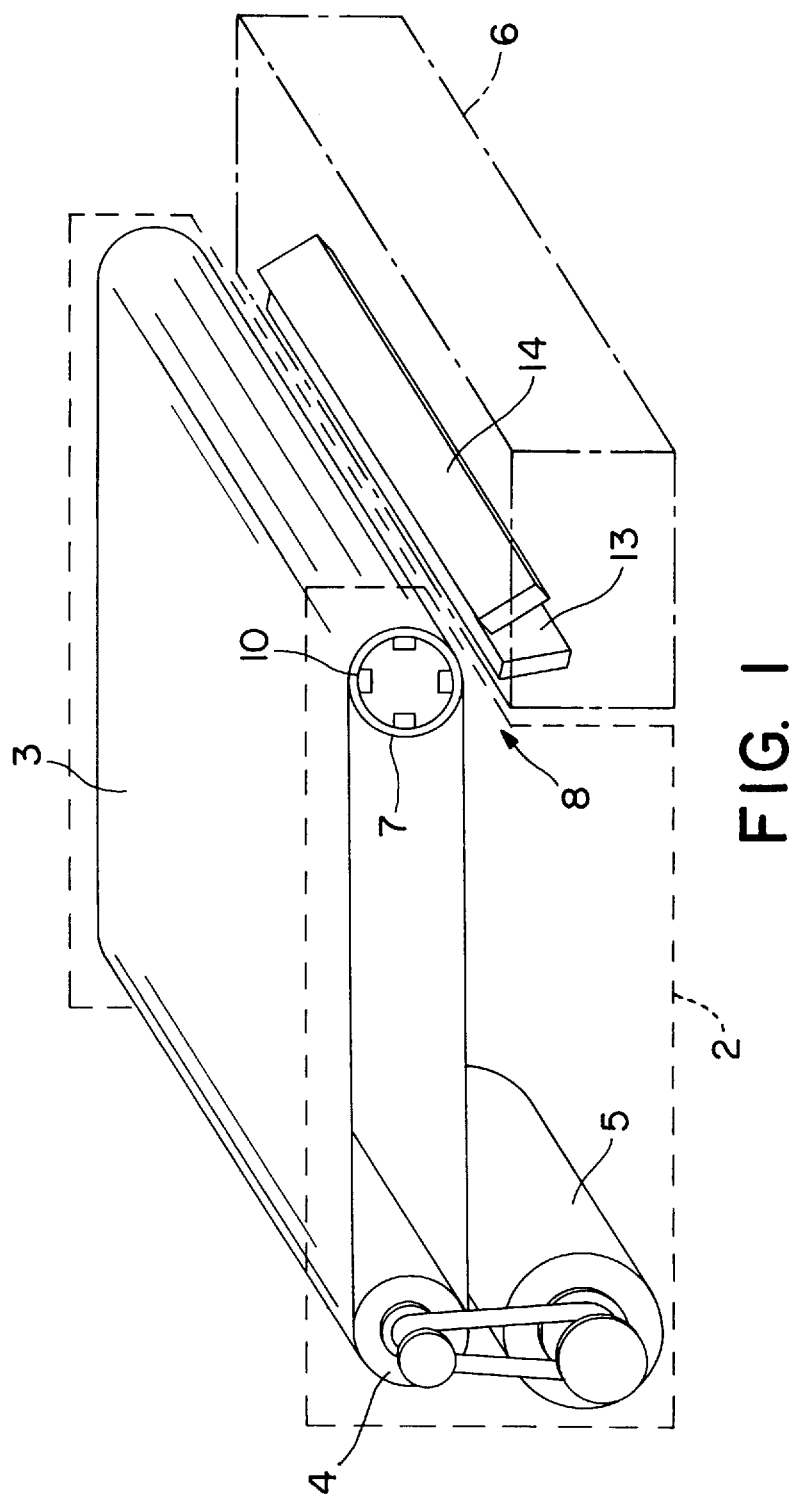
FIG. 1 is a diagrammatic perspective view of a carriage with loading/unloading belt comprising a control device according to a first embodiment of the present invention.

With reference to the FIG. 1, numeral 2 indicates a carriage (shown in phantom) comprising a loading/unloading belt 3 driven by a cylinder 4 which in turn is rotated by motor means 5.

The control of the operation of belt 3 is provided by a device, generally indicated with numeral 8, that is suited to produce a magnetic field that changes with time as a function of the speed of belt 3. In a preferred embodiment, the changing magnetic field is a rotating magnetic field generated by a rotor that is magnetically polarized in radial directions by means of a plurality of permanent magnets 20, the rotor consisting in a tensioning cylinder 7, for example. The tensioning cylinder 7 is less likely to slip relative to the belt movement and thus provides a more accurate indication of actual belt speed than other rollers The time variable magnetic field is detected by means of a pair of aerials or electric windings 13 and 14, the aerials or electric windings being arranged at an angle relative to each other and fixed at a location relative to (or on) the sorting apparatus frame 6 (shown in phantom) along the path of the carriages 2. The angle can be 45° to provide a 90° phase shift in the magnetically generated signals when the magnetic field is provided by alternating poles at the quadrants of the rotor. It can be seen that an electromotive force is induced in the windings 13 and 14, the frequency of which is proportional to the angular speed of the rotor and, consequently, of belt 3.

The induced voltage is suitably amplified by voltage amplifier means, not shown, then is converted into digital form and finally analyzed by computing means that deduce the required information. The voltage amplifiers, analog-to-digital converters and computing means are of a known type and therefore are not further described. See, e.g., U.S. Pat. No. 4,938,335.

Figure 2:
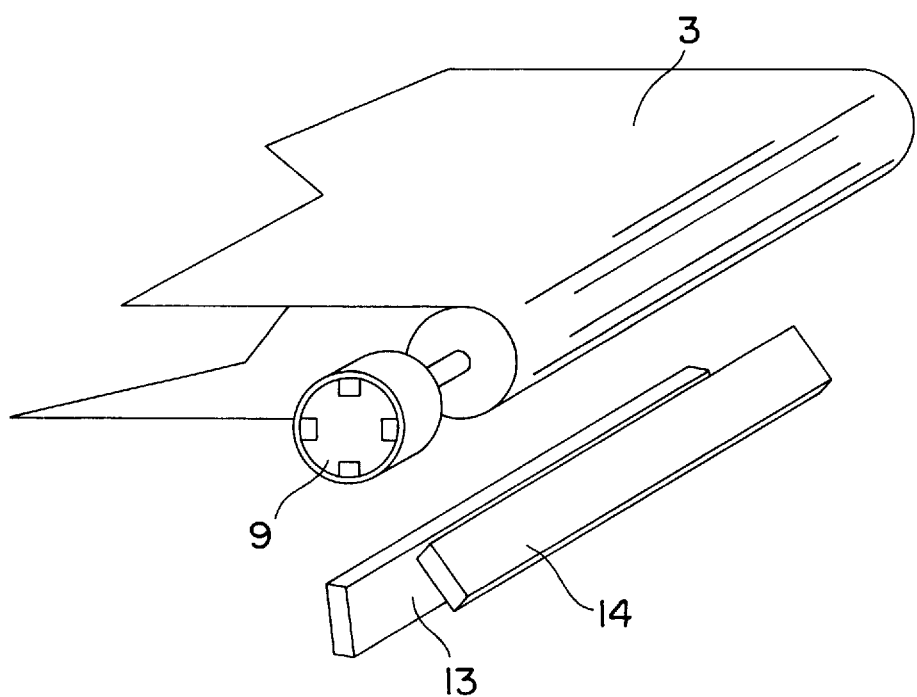
FIG. 2 is a detailed view of a carriage with devices that are suited to create the magnetic field according to a second embodiment, and the devices for detecting and analyzing the obtained signal.

The magnets 10 which create the time-variable magnetic field are preferably located at a suitable distance from the upper surface of belt 3 in order to avoid any possible demagnetization in the transported objects and, if necessary, a rotor 9 mounted on an extension of the belt tensioning cylinder, outside of the carriage (as shown in FIG. 2), can be provided.

The magnets 10 are preferably mounted onto the tensioning cylinder 7 of the belt, thereby allowing also the tension thereof to be checked through a measure of relative slippage between the drive motor means 5 and the measured rotation of the tensioning cylinder 7 of the belt.

Moreover, by monitoring the rotation of the belt, higher functions can also be monitored, such as checking the correctness of the communication between the computer that controls the sorting plant and the individual devices that actuate the carriage belts, the control of the electric power, the control of the motion transmission, etc.

Figure 3:
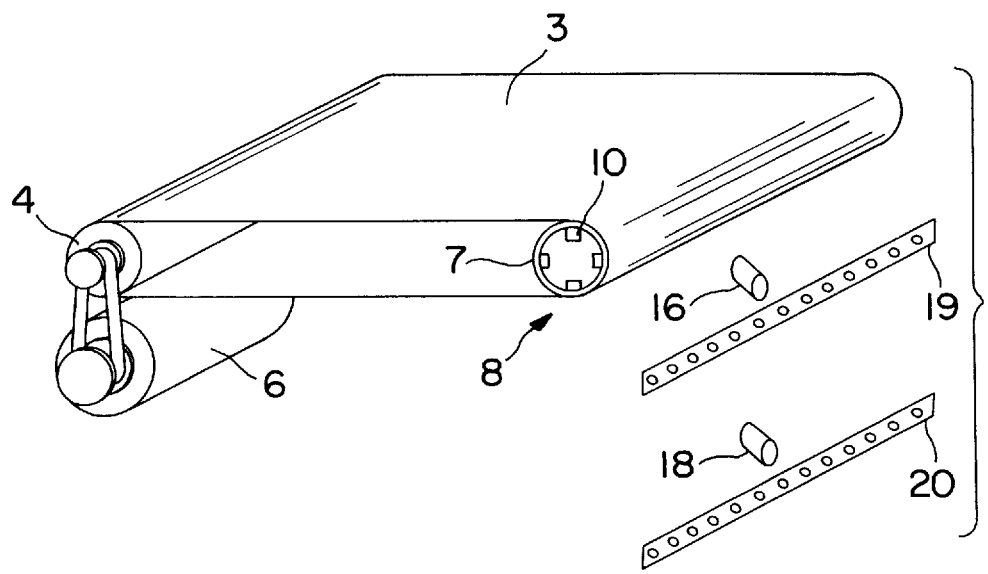
FIG. 3 schematically illustrates a third embodiment of the devices according to the invention.
Figure 4:
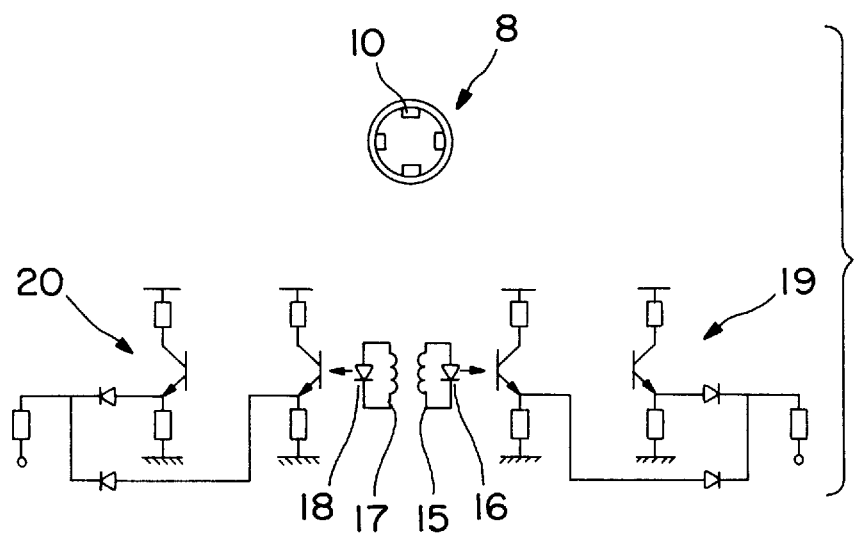
FIG. 4 shows an exemplary electronic circuit usable in conjunction with the third embodiment shown FIG. 3.

According to a different embodiment of the invention (as shown in FIG. 3), on board the carriages there can be provided devices that generate an alternating voltage to drive an infrared light emitting diode (LED). For example, coils 15 and 17 (FIG. 4) can be associated with each carriage. In the coils 15 and 17, the varying magnetic field generates a current which is sent to light emitting diodes 16 and 18. The light emitting diodes 16 and 18 in turn generate an infrared light signal that can be received by devices on the ground or the apparatus frame 6. The receiving devices can consist, for example, of a series or an array of photo-transistors 19 and 20 (FIGS. 3 and 4). The photo-transistors are suitably OR-connected, in order to convert the pulsed infrared light signal into a signal having a frequency proportional to the speed of the cylinder.

In such a case, the device can have the configuration shown in FIG. 3, with two infrared light emitting diodes 17 and 18, each of which is energized by its own coil, the diodes 17 and 18 being offset by a certain number of degrees relative to the rotation axis of the belt tensioning cylinder, so that each produces, onto the corresponding receivers 19 and 20, cyclical signals. The phase difference of the cyclical signals indicates the rotation direction of the cylinders, the period of which providing the speed information.

Characteristic of the invention is that of providing means integral with the carriage that are suitable for creating a magnetic variable field as a function of the belt rotation speed, and means that are capable of sensing and analyzing a signal generated from the varying magnetic field in order to supply information about the rotation of the belt. The present invention is however open to many changes and modifications that are encompassed within the inventive concept. In practice, the materials and devices employed will be according to the requirements of the system and the availability of the components.

What is claimed is:

1. A device for monitoring the movement of a loading/unloading belt of a transportation carriage transported along a machine frame in a sorting plant, said device comprising:

means integral with the transportation carriage for providing a magnetic field, said magnetic field changing in time as a function of the speed of the loading/unloading belt;

means located at a fixed position relative to the machine frame for generating a signal indicative of said changing magnetic field used to monitor the movement of said loading/unloading belt; and two coils integral with the transportation carriage and associated with said means for providing a magnetic field, said two coils being connected to two light emitting diodes, wherein said signal generating means includes a plurality of photo-transistors arranged along a path of said transportation carriage for receiving light from said two light emitting diodes.

2. A device according to claim 1, wherein said means for providing a magnetic field includes a rotor, said rotor being magnetically polarized in radial directions and mechanically connected to said loading/unloading belt.

3. A device according to claim 2, wherein said rotor includes a plurality of magnets that are integral with one cylinder of said loading/unloading belt.

4. A device according to claim 3, wherein said magnets are integral with a tensioning cylinder of said loading/unloading belt.

5. A device for monitoring the movement of a loading/unloading belt of a transportation carriage transported along a machine frame in a sorting plant, said device comprising:

a magnetic field generator integral with the transportation carriage and providing a magnetic field changing in time as a function of the speed of the loading/unloading belt;

a signal generator located at a fixed position relative to the machine frame and generating a signal indicative of said changing magnetic field used to monitor the movement of said loading/unloading belt; and two coils integral with the transportation carriage and associated with said magnetic field generator, said two coils being connected to two light emitting diodes; and wherein said signal generator includes a plurality of photo-transistors arranged along a path of said transportation carriage for receiving light from said two light emitting diodes.

6. A device according to claim 5, wherein said magnetic field generator includes a rotor, said rotor being magnetically polarized in radial directions and mechanically connected to said loading/unloading belt.

7. A device according to claim 6, wherein said rotor includes a plurality of magnets that are integral with one cylinder of said loading/unloading belt.

8. A device according to claim 7, wherein said magnets are integral with a tensioning cylinder of said loading/unloading belt.

* * * * *